(12) United States Patent
West et al.

(10) Patent No.: US 10,202,295 B2
(45) Date of Patent: Feb. 12, 2019

(54) WATER BIOTREATMENT UNIT

(71) Applicant: BioGill Environment Pty Limited, Taren Point (AU)

(72) Inventors: John David West, Werri Beach (AU); Mark John Smith, Cronulla (AU)

(73) Assignee: BioGill Environmental Pty Limited, Taren Point (AU)

( * ) Notice: Subject to any disclaimer, the term of this patent is extended or adjusted under 35 U.S.C. 154(b) by 108 days.

(21) Appl. No.: 15/305,610

(22) PCT Filed: Apr. 22, 2015

(86) PCT No.: PCT/AU2015/000232
§ 371 (c)(1),
(2) Date: Oct. 20, 2016

(87) PCT Pub. No.: WO2015/161335
PCT Pub. Date: Oct. 29, 2015

(65) Prior Publication Data
US 2017/0044037 A1    Feb. 16, 2017

(30) Foreign Application Priority Data
Apr. 23, 2014  (AU) .............................. 2014901469

(51) Int. Cl.
*C02F 3/10* (2006.01)

(52) U.S. Cl.
CPC .............. *C02F 3/102* (2013.01); *C02F 3/101* (2013.01); *C02F 3/103* (2013.01); *Y02W 10/15* (2015.05)

(58) Field of Classification Search
CPC .... C02F 3/103; C02F 3/06; C02F 3/10; C02F 3/04; C02F 3/101; C02F 3/102; B01D 2315/06
(Continued)

(56) References Cited

U.S. PATENT DOCUMENTS 5,397,474 A  *  3/1995  Henry .................. B01F 3/0473
                                                        210/150
5,505,916 A  *  4/1996  Berry, Jr. .................. A61L 2/06
                                                        422/300
(Continued)

FOREIGN PATENT DOCUMENTS

WO   WO-2005111193 A1   11/2005
WO   WO-2007056818 A1    5/2007

OTHER PUBLICATIONS

International Search Report issued in PCT/AU2015/000232 dated May 29, 2015.

*Primary Examiner* — Claire A Norris
(74) *Attorney, Agent, or Firm* — Marshall, Gerstein & Borun LLP

(57) ABSTRACT

A water treatment unit has a support housing vertically extending between a support housing upper end and a support housing lower end. The support housing includes a pair of opposing primary housing walls and a pair of opposing secondary housing walls. Each of the secondary housing walls is formed separately from, and mechanically joined to, each of the primary housing walls. Each of the primary housing walls is perforated to allow airflow in a first direction laterally through a treatment cavity defined by the housing walls. A plurality of hangers extend in the first direction between the primary housing walls and are supported by the support housing. The hangers are mutually spaced between the secondary housing walls across the treatment cavity (23). A plurality of biotreatment membranes each carry a biomass culture and are draped over, and supported by, one of the hangers to define two opposing membrane walls each extending downwardly from the hanger.

18 Claims, 17 Drawing Sheets

(58) Field of Classification Search
USPC .................................... 210/150, 232, 747.6
See application file for complete search history.

(56) References Cited

U.S. PATENT DOCUMENTS 6,022,476 A * 2/2000 Hausin .................. B01F 3/0412
210/150
6,406,630 B1 * 6/2002 Henry ................... B01F 3/0473
210/150

* cited by examiner

WATER BIOTREATMENT UNIT

FIELD OF THE INVENTION

The present invention relates to the field of biotreatment of water, such as wastewater and aquaculture water, and particularly relates to a water biotreatment unit, a kit for forming a water biotreatment unit and a method of assembling a water biotreatment unit.

BACKGROUND OF THE INVENTION

Various forms of bioreactor are known for treating wastewater, utilizing biomass cultures to absorb waste nutrients from the wastewater. Membrane bioreactors generally utilize permeable membranes carrying a biomass culture that is exposed to the wastewater to be treated and oxygen, which is required for the biomass culture to treat the wastewater to remove waste nutrients from the same.

OBJECT OF THE INVENTION

It is an object of the present invention to substantially overcome or at least ameliorate at least one of the above disadvantages.

SUMMARY OF THE INVENTION

In a first aspect, the present invention provides a water biotreatment unit comprising:

a support housing vertically extending between a support housing upper end and a support housing lower end, said support housing comprising a pair of opposing primary housing walls and a pair of opposing secondary housing walls, each of said secondary housing walls being formed separately to, and mechanically joined to, each of said primary housing walls, each of said primary housing walls being perforated to allow air flow in a first direction laterally through a treatment cavity defined by said housing walls;

a plurality of hangers each extending in said first direction between said primary housing walls and supported by said support housing, said hangers being mutually spaced between said secondary housing walls across said treatment cavity; and a plurality of biotreatment membranes, each said biotreatment membrane carrying a biomass culture and being draped over, and support by, one of said hangers to define two opposing membrane walls each extending downwardly from said hanger.

Typically said biotreatment unit further comprises a plurality of spacers each extending in said first direction between said primary housing walls and supported by said support housing, each said spacer extending between said membrane walls of one of said membranes to space said membrane walls.

In a preferred form, each said primary housing wall is perforated by way of a honeycomb-type array of apertures distributed across at least a majority of said primary housing wall.

In at least a preferred embodiment, each said housing wall is at least substantially identical.

In at least one embodiment, each said secondary housing wall is joined to each said primary housing wall by way of a connection along adjacent side edges of the respective said secondary housing wall and primary housing wall.

Typically, each said connection comprises a first series of apertured flanges formed along one side edge of one of said primary housing walls, a second series of apertured flanges formed along an adjacent side edge of one of said secondary housing walls and one or more pins extending through one or more of said flanges of said secondary housing wall and one or more said flanges of said primary housing wall.

Typically, said biotreatment unit further comprises a series of opposing hanger recesses arranged adjacent an upper end of each of said primary housing walls, each said hanger recess receiving an end of one of said hangers.

In one form, said biotreatment unit further comprises a hanger support frame mounted on and supported by said primary housing walls, said hanger support frame having said hanger recesses.

In one embodiment, said hanger support frame is further supported by said secondary housing walls.

In a preferred form, said biotreatment unit further comprises a pair of opposing spacer support rails, each said spacer support rail being mounted adjacent one of said primary housing walls, each said spacer support rail being adapted to support an end of each of said spacers.

In a particularly preferred form, each of said spacer support rails is provided with a series of spacer recesses, each said spacer recess receiving an end of one of said spacers.

In one embodiment, said biotreatment unit further comprises an outer housing extending about said support housing, said outer housing comprising a pair of opposing primary outer walls and a pair of opposing secondary outer walls, each said secondary outer wall being formed separately to each of said primary outer walls, each said primary outer wall being adjacent to, and spaced from, one of said primary housing walls and perforated to allow air flow through the primary outer wall and the adjacent said primary housing wall, each said secondary outer wall being adjacent one of said secondary housing walls.

In a preferred form, said biotreatment unit further comprises a lid mounted on said outer housing, said lid being provided with a removable cap mounted over an access port formed in said lid.

In a preferred embodiment, said biotreatment unit further comprises a base on which said support housing is mounted, said base defining a sump beneath said plurality of biotreatment members and an outlet for passage of treated water.

In a second aspect the present invention provides a kit for forming a water biotreatment unit, said kit comprising:

a pair of primary housing walls, each being perforated to allow airflow therethrough;

a pair of secondary housing walls each formed separately to each of said primary housing walls, said primary and secondary housing walls being configured to mechanically join each of said secondary housing walls to each of said primary housing walls to define a support housing defining a treatment cavity;

a plurality of hangers adapted to extend in a first direction between, and be supported by, said primary housing walls with said hanging rails mutually spaced between said secondary housing walls across said treatment cavity; and a plurality of biotreatment membranes, each said biotreatment membrane carrying a biomass culture and adapted to be draped over, and supported by, one of said hangers to define two opposing membrane walls each extending downwardly from said hanger.

Typically said kit further comprises a plurality of spacers adapted to be supported by said primary housing walls and extending between said primary housing walls in said first direction with each said spacer extending between said membrane walls of one of said biotreatment membranes to space said membrane walls, when assembled.

In a preferred form, said kit further comprises a hanger support frame adapted to be mounted on and supported by said primary housing walls, said hanger support frame being adapted to receive and support said plurality of hangers.

In a preferred form, said kit further comprises a pair of spacer support rails, each said spacer support rail being adapted to be fastened to one of said primary housing walls, each said spacer support rail being adapted to support an end of each of said spacers.

In one embodiment, said kit further comprises a pair of primary outer walls and a pair of secondary outer walls, said primary and secondary outer walls being adapted to form an outer housing extending about said support housing with each said primary outer wall located adjacent to, and spaced from, one of said primary housing walls when assembled and perforated to allow airflow through the primary outer wall and the adjacent said primary housing wall.

In a preferred form, said kit further comprises a lid adapted to be mounted on said outer housing and a removable cap adapted to be mounted over an access port formed in said lid.

In a preferred embodiment, said kit further comprises a base defining a sump and an outlet for passage of treated water, said base being configured to receive said support housing.

In a third aspect the present invention provides a method of assembling the kit of the second aspect, said method comprising:
a) mechanically joining one of said secondary housing walls to each of said primary housing walls so as to partly form said support housing;
b) mounting each of said plurality of hangers so as to extend in said first direction between said primary housing walls and supported by said support housing, with said hangers being mutually spaced;
c) draping each of said plurality of biotreatment membranes over one of said hangers such that said biotreatment membrane is supported by said hanger and defines two opposing membrane walls each extending downwardly from said hanger; and
d) mechanically joining the other of said secondary housing walls to each of said primary housing walls to complete said support housing.

Typically, said method further comprises the step of mounting each of said plurality of spacers to extend in said first direction between said primary housing walls and be supported by said support housing with each said spacer extending between said membrane walls of one of said membranes walls.

BRIEF DESCRIPTION OF THE DRAWINGS

Preferred embodiments of the present invention will now be described, by way of example only, with reference to the accompanying drawings wherein.

DETAILED DESCRIPTION

Figure 1:
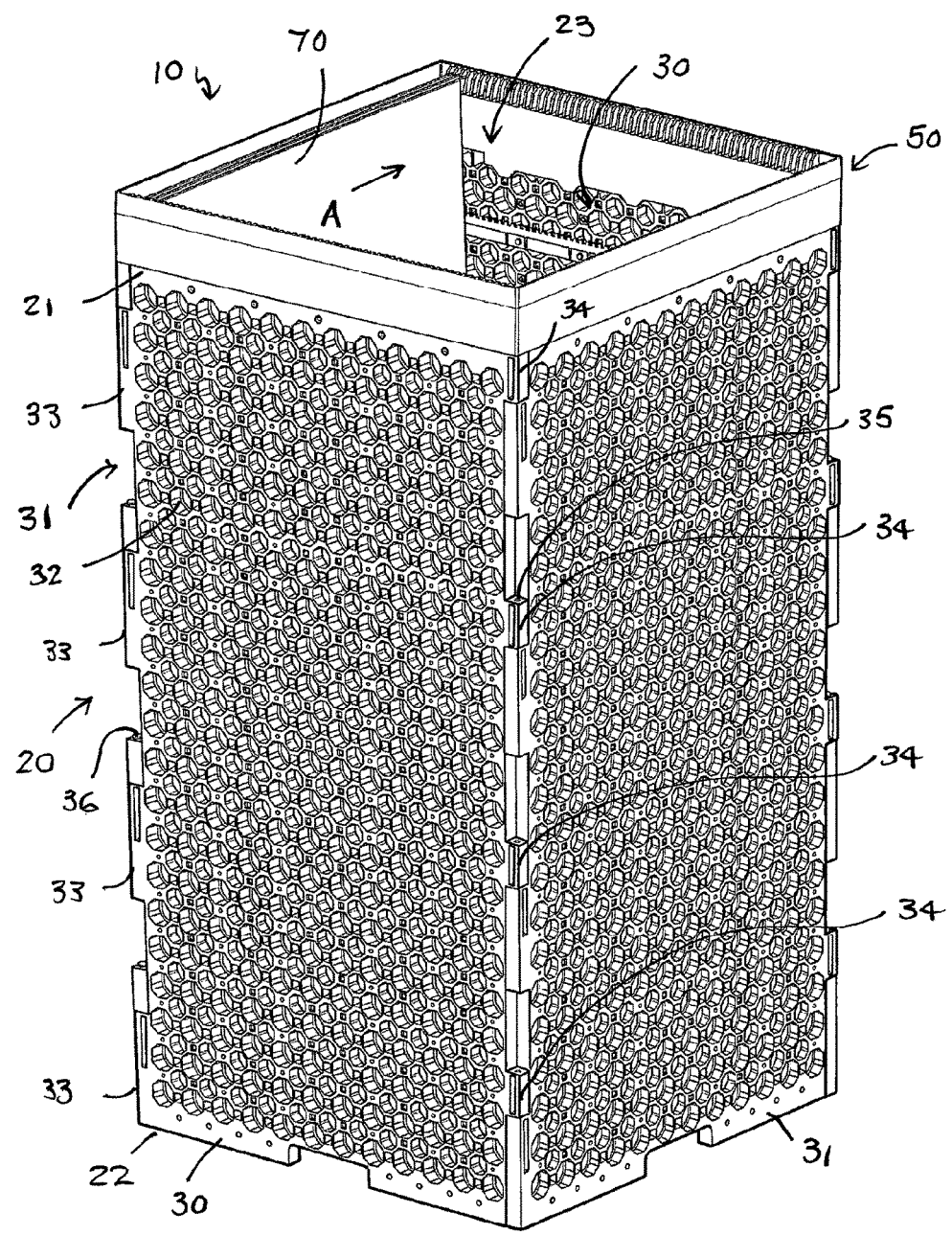
FIG. 1 is an isometric view of the core of a water biotreatment unit according to a first embodiment.
Figure 2:
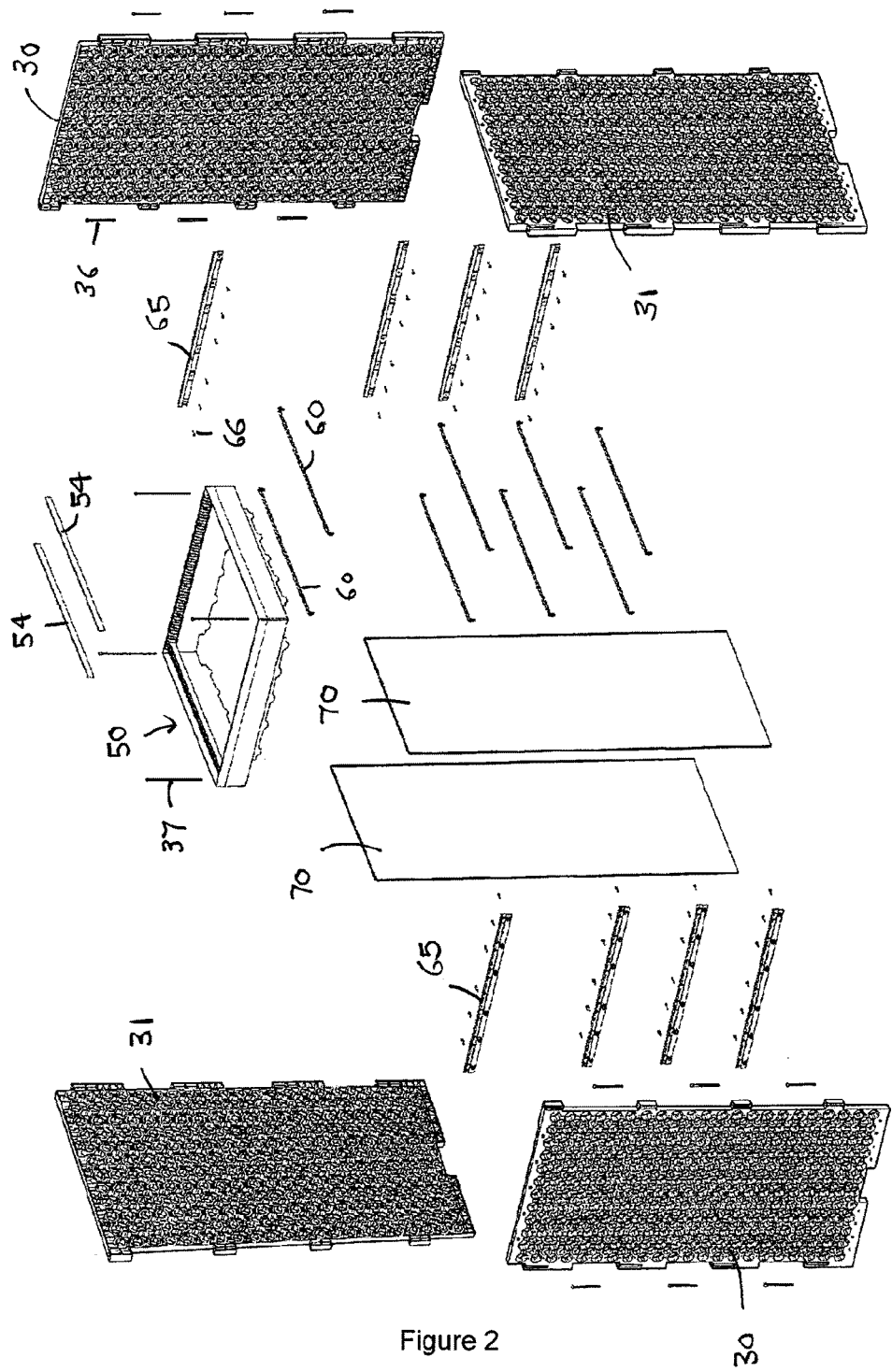
FIG. 2 is an exploded view of the water biotreatment unit core of FIG. 1.
Figures 3, 4:
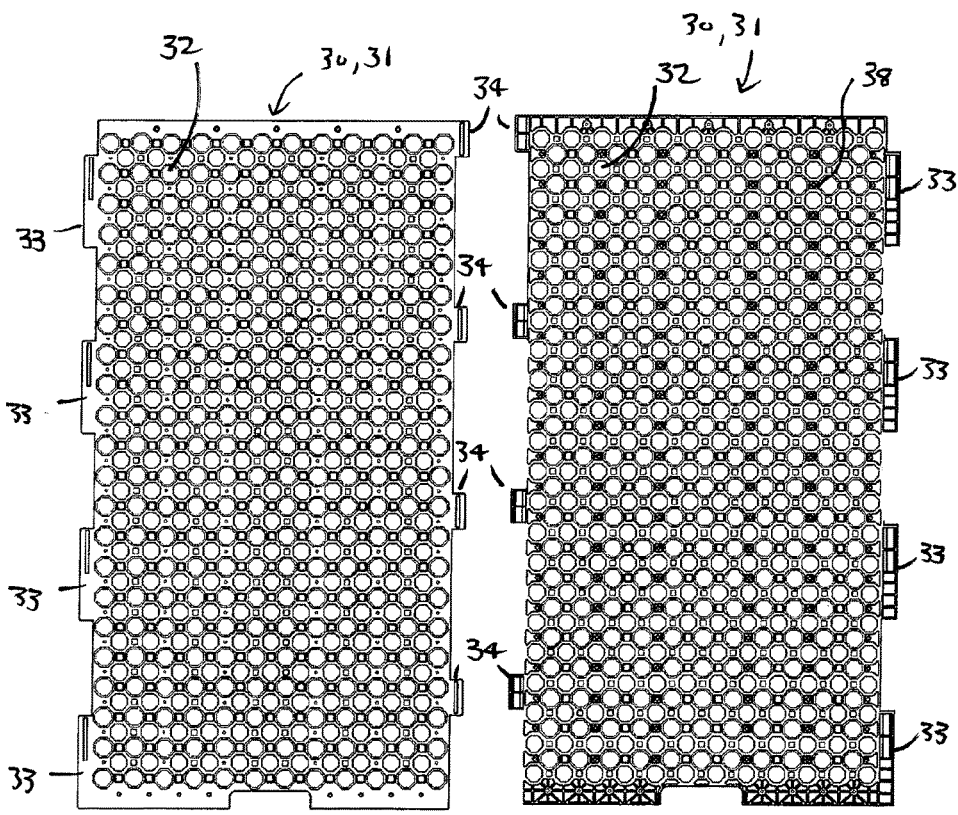
FIG. 3 is a front elevation view of a housing wall of the water biotreatment unit core of FIG. 1.
FIG. 4 is a rear elevation view of the housing wall of FIG. 3.
Figure 5:
FIG. 5 is a plan view of the housing wall of FIG. 3.

Referring firstly to FIGS. 1 and 2 of the accompanying drawings, a water biotreatment unit core 10 according to a first embodiment has a support housing 20 that vertically extends between a support housing upper end 21 and support housing lower end 22. The support housing 20 comprises a structure of four walls, being a pair of opposing primary housing walls 30 and a pair of opposing secondary housing walls 31. Each of the secondary housing walls 31 is formed separately to each of the primary housing walls 30. The support housing 20 is formed by mechanically joining each of the secondary housing walls 31 to the two adjacent primary housing walls 30. Each of the primary housing walls 30 is perforated to allow airflow in a first direction A laterally through a treatment cavity 23 defined by the housing walls 30, 31. In the embodiment depicted, the secondary housing walls 31 are also perforated, although the secondary housing walls 31 could equally be solid, given that there is no requirement for airflow in a direction transverse to the first direction A. In the embodiment depicted, for cost effective manufacture and ease of assembly, each of the primary housing walls 30 and secondary housing walls 31 is identical. The housing walls 30, 31 are typically moulded from a structural plastics material, such as polypropylene, polyethylene or similar.

Each of the housing walls 30, 31 is typically perforated by way of a honeycomb-type array of apertures 32, distributed evenly in aligned rows and columns across at least a majority of each housing wall 30, 31 and, in the arrangement depicted, the entirety of each housing wall 30, 31, apart from the peripheral edges thereof. The honeycomb-type structure provides a lightweight structure allowing for a high degree of airflow, while still retaining sufficient load bearing capacity to support various components of the water biotreatment unit core 10 as will be further discussed below. To provide for relatively uninhibited airflow through the primary housing walls 30, it is preferred that the airflow apertures 32 comprise at least 50 percent of the total surface area of each primary housing wall 30. In the embodiment depicted, the airflow apertures 32 comprise approximately 75 percent of the surface area of each primary housing wall 30. In the arrangement depicted, each of the housing walls 30, 31 measures approximately 1963 mm in height, 1056 mm in width and 38 mm in thickness. Each of the housing walls 30, 31 is of generally rectangular form. Each of the housing walls 30, 31 is also provided with various other smaller apertures, as will be further discussed below, for securing various components to the housing walls 30, 31. The dimensions of the housing walls 30, 31 may be varied to suit the application. The thickness of each of the housing walls 30, 31 will typically be between 20 mm and 40 mm.

Each of the secondary housing walls 31 is joined to each primary housing wall 30 by way of a connection along adjacent side edges of the housing walls 30, 31. In the arrangement depicted, each connection comprises a first series of apertured flanges 33 formed along one side edge of each of the housing walls 30, 31 and a second series of apertured flanges 34 formed along the opposing side edge of each of the housing walls 30, 31. On each housing wall 30, 31, the flanges 33 on one side edge are vertically offset from the flanges 34 formed on the opposing side edge so as to allow for interleaving of the flanges 33, 34 on adjacent housing walls 30, 31. The flanges 33, 34 are each provided with central vertically extending apertures 35 which receive pins 36 to secure adjacent flanges 33, 34 of adjacent side edges of adjacent housing walls 30, 31 so as to form a rigid support housing 20. One pin 36 may be provided to secure each pair of adjacent flanges 33, 34 or alternatively a single longer pin may extend through multiple vertically adjacent pairs of flanges 33, 34. It is also envisaged that the housing walls 30, 31 may be mechanically joined by other means, such as by screw fasteners or the like. The pin connection, however, is preferred, allowing simple assembly of the support housing 20 in situ without the use of any tools. It is further envisaged that the housing walls 30, 31 may be integrally moulded with an interlocking arrangement.

Figure 6:
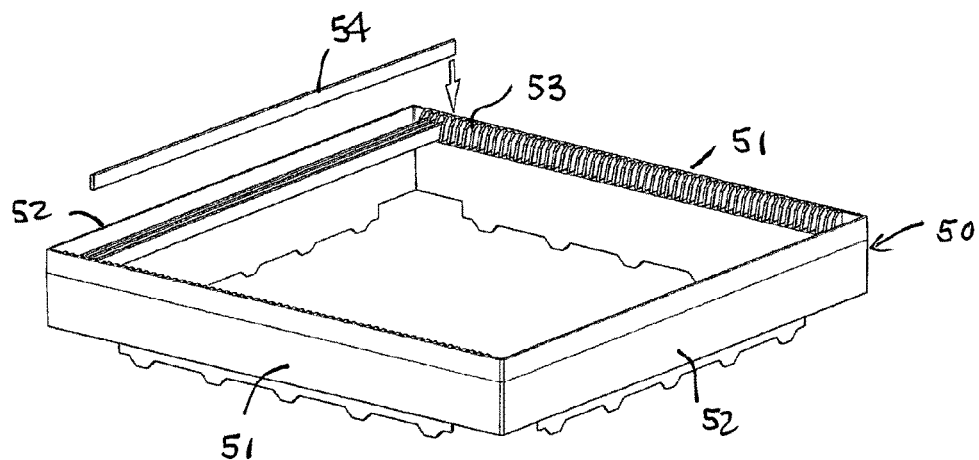
FIG. 6 is an isometric view of the hanger frame and several hangers of the water biotreatment core of FIG. 1.
Figure 7:
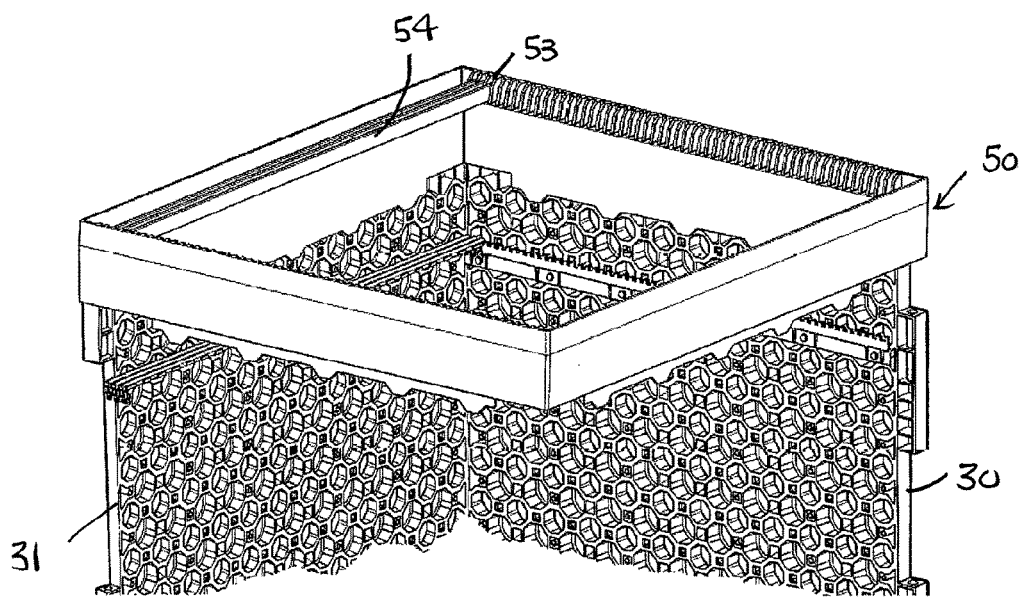
FIG. 7 is fragmentary view of the water biotreatment unit core of FIG. 1 in a partially assembled state.

Referring specifically to FIGS. 6 and 7, the water biotreatment unit core 10 further comprises a hanger support frame 50 that is mounted on and supported by the primary housing walls 30 and, in the embodiment depicted, the secondary housing walls 31. The hanger support frame 50 is of a square form, comprising a pair of opposing primary support frame elements 51 and a pair of opposing secondary support frame elements 52. The hanger support frame 50 is here integrally moulded from a structural plastics material, such as polypropylene or similar. The hanger support frame 50 is mounted on the support housing upper end 21. Specifically, the primary support frame elements 51 fit over the upper end of the primary housing walls 30, whilst the secondary support frame elements 52 fit over the upper end of the secondary housing walls 31. The hanger support frame 50 thus assists in locking the housing walls 30, 31 in position. The hanger support frame 50 is locked into position on the support housing 20 by way of elongate pins 37 that extend through apertures (not depicted) provided adjacent the intersection of each primary support frame element 51 and adjacent secondary support frame element 52 into apertures 35 of the uppermost flanges 33, 34 of the underlying housing walls 30, 31.

Each of the opposing primary support frame elements 51 is provided with a series of hanger recesses 53 provided along its length on an internal face adjacent the upper end of each of the primary housing walls 30. Each of the hanger recesses 53 receives an end of a hanger 54 that extends in the first direction A between the opposing primary support frame elements 51. Each of the hangers 54 is thus supported by the hanger support frame 50, and in turn, the primary housing walls 30. Each of the hangers 54 is of a constant rectangular cross-section and is typically formed of a structural plastics material such as polypropylene or similar. In the configuration depicted, there are a series of fifty eight hangers 54 and associated hanger recesses 53 (although only three hangers 54 are depicted in the figures for clarity purposes). In various configurations, there will typically be between forty and eighty hangers 54 and associated hanger recesses 53.

Figure 8:
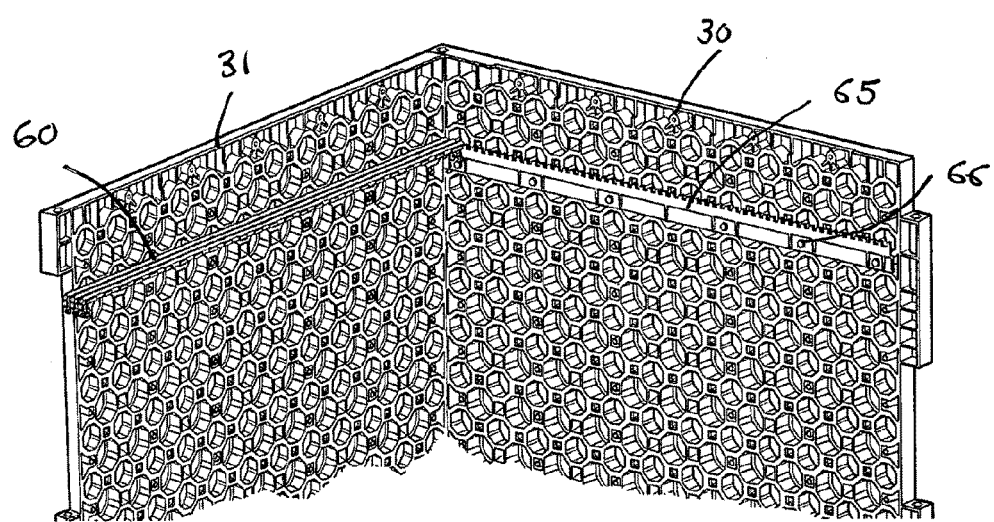
FIG. 8 is a fragmentary view of the water biotreatment unit core of FIG. 1 in another partially assembled state.
Figure 9:
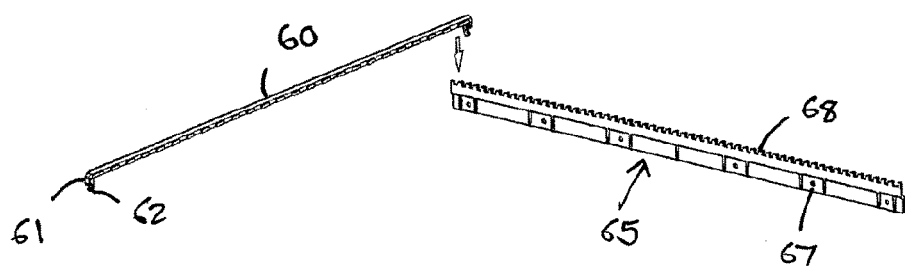
FIG. 9 is an isometric view of a spacer rail and spacer of the water biotreatment unit core of FIG. 1.

Referring specifically to FIGS. 8 and 9, the water biotreatment unit core 10 further comprises a plurality of spacers 60 that each extend in the first direction A between, and supported by, the primary housing walls 30. In the embodiment depicted, each of the spacers 60 is supported at each opposing end by a spacer support rail 65 mounted adjacent to, and fastened to, one of the primary housing walls 30. Each spacer 60 is fastened to the respective primary housing wall 30 by way of fasteners 66 extending through apertures 67 provided along the length of the spacer support rail 65, with the fasteners 66 being received in corresponding apertures 38 distributed across each primary housing wall 30, and located between the airflow apertures 32. The fasteners 66 and apertures 38 are configured such that the fasteners clip in to place without the use of any tool. The upper edge of each spacer support rail 65 is of a castellated form, defining recesses or notches 68 that each receive the end of one of the spacers 60. Each end of each spacer 60 is provided with a pair of downwardly protruding lugs 61, 62, with a gap therebetween for receipt of the spacer support rail 65, so as to provide for a secure connection between the spacer 60 and spacer support rail 65. The spacers 60 and spacer support rails 65 are typically formed of plastics material such as polypropylene or similar. The number of spacers 60 secured to each spacer support rail 65 is typically equal to the number of hangers 54, being fifty eight in the embodiment depicted (although again, for clarity purposes, only three spacers 60 are depicted).

As best shown in FIG. 2, in the first embodiment depicted, multiple sets of spacer support rails 65 and spacers 60 are provided, vertically spaced along the primary housing walls 30. In the particular arrangement depicted, there are four such sets of spacer support rails 65 and spacers 60. The spacer support rails 65 may additionally, or alternative, be supported by the secondary housing walls 31.

Figure 10:
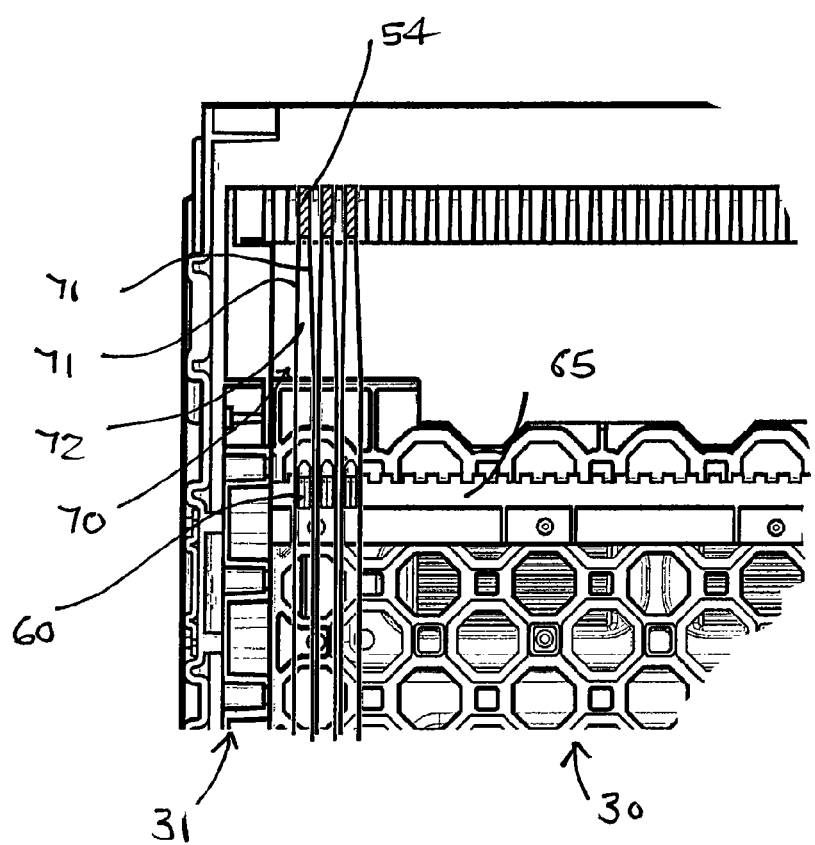
FIG. 10 is a fragmentary cross-sectional view of an upper side portion of the water biotreatment unit core of FIG. 1.
Figure 11:
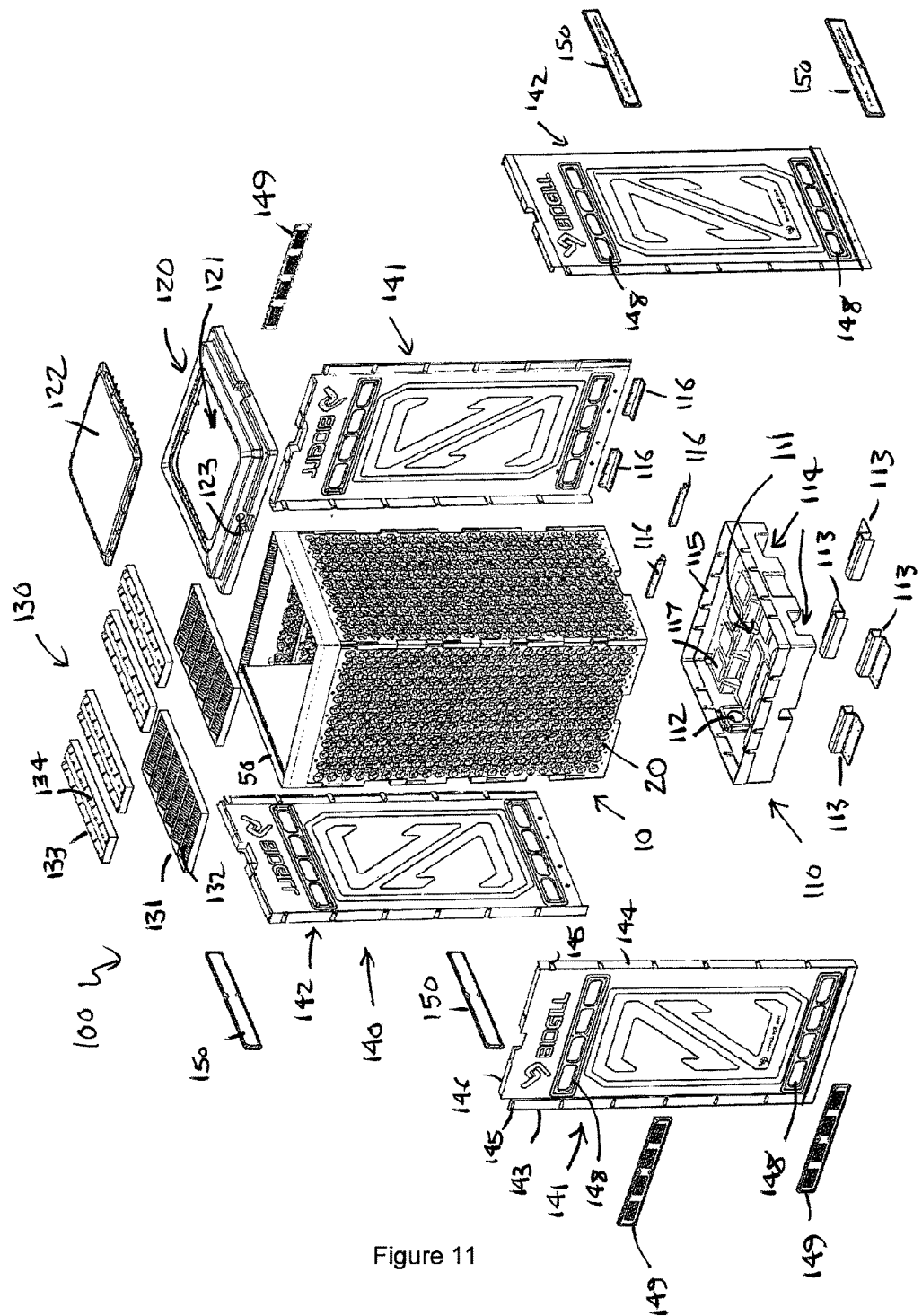
FIG. 11 is an exploded view of a water biotreatment unit according to a first embodiment incorporating the water biotreatment core of FIG. 1.

Referring to FIGS. 1, 2 and 10, the biotreatment unit core 10 further comprises a plurality of biotreatment membranes 70. Each biotreatment membrane 70 is, as best depicted in FIG. 10, draped over and supported by one of the hangers 54. Each draped biotreatment membrane 70 thus defines two opposing membrane walls 71 extending downwardly from the hanger 54. In a preferred embodiment, each biotreatment membrane 70 is formed into a loop by stitching the opposing ends of a 4 m by 1 m biotreatment membrane 70 together part way along the ends, leaving an opening at the base of the loop for water and decaying biomass to pass through. In the configuration depicted, there are a series of fifty eight biotreatment membranes 70, one draped over each hanger 54. In various configurations, there will typically be between forty and eighty biotreatment membranes 70, matching the number of hangers 54 and the number of spacers 60 secured to each spacer support rail 65. As best shown in FIG. 10, each of the spacers 60 extends between the opposing membrane walls 71 of one of the membranes 70, to thereby space the membrane walls 71 of each biotreatment membrane 70. This provides an air gap 72 between each of the membrane walls 71 of each membrane 70 for air flow passing through the air flow apertures 32 in the first direction A and through the treatment cavity 23. Providing multiple sets of spacers 60, vertically spaced along the height of the primary housing walls 30, assists in ensuring that the membrane walls 71 of each biotreatment membrane 70 remain spaced substantially throughout the extent of each biotreatment membrane 70. Forming the biotreatment membrane 70 in a loop helps to keep the membrane walls taut, due to the mass of water and biomass caught in the base of the loop before passing out of the opening in the base.

Each biotreatment membrane 70 carries a biomass culture for treating influent flow passing downwardly through the treatment chamber 23 between adjacent biotreatment membranes 70. The outwardly facing surfaces of adjacent membrane walls 71 of adjacent biotreatment membranes 70 will either be closely spaced, or touching, providing for restrained vertical flow of wastewater down the biomass culture laden membrane walls 71. The biotreatment membrane 70 and biomass culture are typically as per that described in International (PCT) Publication No. WO 2007/056818, the entire contents of which is expressly incorporated herein by cross-reference. The biotreatment membrane 70 may be in the form of a permeable, porous and flexible nano ceramic terephthalate membrane, allowing diffusion of oxygen and soluble waste nutrients through the membrane. The biomass culture may comprise bacteria and fungi and may be carried by the biotreatment membrane 70 in the form of a biofilm on the outwardly facing surface (the liquid face) of each membrane wall 71, and a biofilm on the inwardly facing surface (the gas face) of each membrane wall 71. The biomass culture acts on a liquid/gas interface, growing through the membrane wall 71 to draw oxygen from the gas face and feeding on nutrients from the liquid face.

Whilst the water biotreatment unit core 10 may be operated itself as a complete water biotreatment unit, a complete water biotreatment unit 100 according to a first embodiment, incorporating the water biotreatment unit core 10, is depicted in FIGS. 11 to 14. The water biotreatment unit 100 typically further comprises a base 110 on which the support housing 20 is mounted. The base 110 defines a sump 111 beneath the treatment chamber 23 and the biotreatment membranes 70. An outlet 112 is defined in a side wall of the base 110. The base 110 is integrally moulded from a structural plastics material such as polypropylene, polyethylene or similar. The base 110 may be secured to an underlying support surface, such as a concrete slab, by way of a set of four brackets 113 that are received in recesses 114 formed in the lower side of the base 110. The support housing lower end 22 is received within the base 110, with the housing walls 30, 31 adjacent the peripheral walls 115 of the base 110. The support housing 20 may be secured to the base 110 by way of a set of further brackets 116 secured to the rear face of each of the primary housing walls 30 and the floor 117 of the base 110 by way of fasteners (not depicted).

A lid 120 is mounted on the support housing upper end 21 and hanger support frame 50. The lid 120 is formed with a central access opening 121 on which is mounted a removable cap 122 that allows access to the treatment cavity 23. The lid 120 and cap 122 are typically moulded from plastics material. An inlet 123 is defined on a side wall of the lid 120, for passage of water to be treated into the treatment cavity 23.

The biotreatment unit 100 further comprises a water distribution system 130 mounted above the biotreatment membranes 70, and particularly mounted on the hanger support frame 50 below the lid 120. The water distribution system 130 comprises a pair of drip trays 131 each having a series of spaced flow distribution vanes 132 each extending in the first direction A, and a set of four distributor trays 133 mounted on top of the drip trays 131 and having a series or spaced flow distribution vanes 134 also each extending in the first direction A. The drip trays 131 and distribution trays 133 act to distribute water passing into the biotreatment unit 10 via the inlet 124 relatively evenly across the top of, and parallel to, the biotreatment membranes 70.

The biotreatment unit 100 may further comprise an outer housing 140 that extends about the support housing 20. The outer housing 140 comprises a structure of four outer walls, being a pair of opposing primary outer walls 141 and a pair of opposing secondary outer walls 142. Each of the secondary outer walls 142 is formed separately to each of the primary outer walls 141. The outer housing 140 is formed by mechanically joining each of the secondary outer walls 142 to the two adjacent primary outer walls 141. As with the primary and secondary housing walls 30, 31, for cost effective manufacture and ease of assembly, each of the primary outer walls 141 and secondary outer walls 142 is identical in the embodiment depicted. The outer housing walls 141, 142 are typically moulded from plastics material, such as polypropylene, polyethylene or similar.

Each of the outer walls 141, 142 is formed with a laterally extending flange 143 down one side and a rearwardly extending flange 144 down the opposing side. Each of the flanges 143, 144 is provided with a series of aligned apertures 145 spaced along its length. Each secondary outer wall 142 is mechanically joined to the two adjacent primary outer walls 141 by fasteners (not depicted) extending through the apertures 145 of the flanges 143, 144 of the adjoining outer walls 141, 142, which are located so as to overlap and align the apertures 145. A further rearwardly extending flange 146 is formed at the top of each of the outer walls 141, 142, and extends over a peripheral wall of the hanger frame 50 beneath the lid 120.

Figure 13:
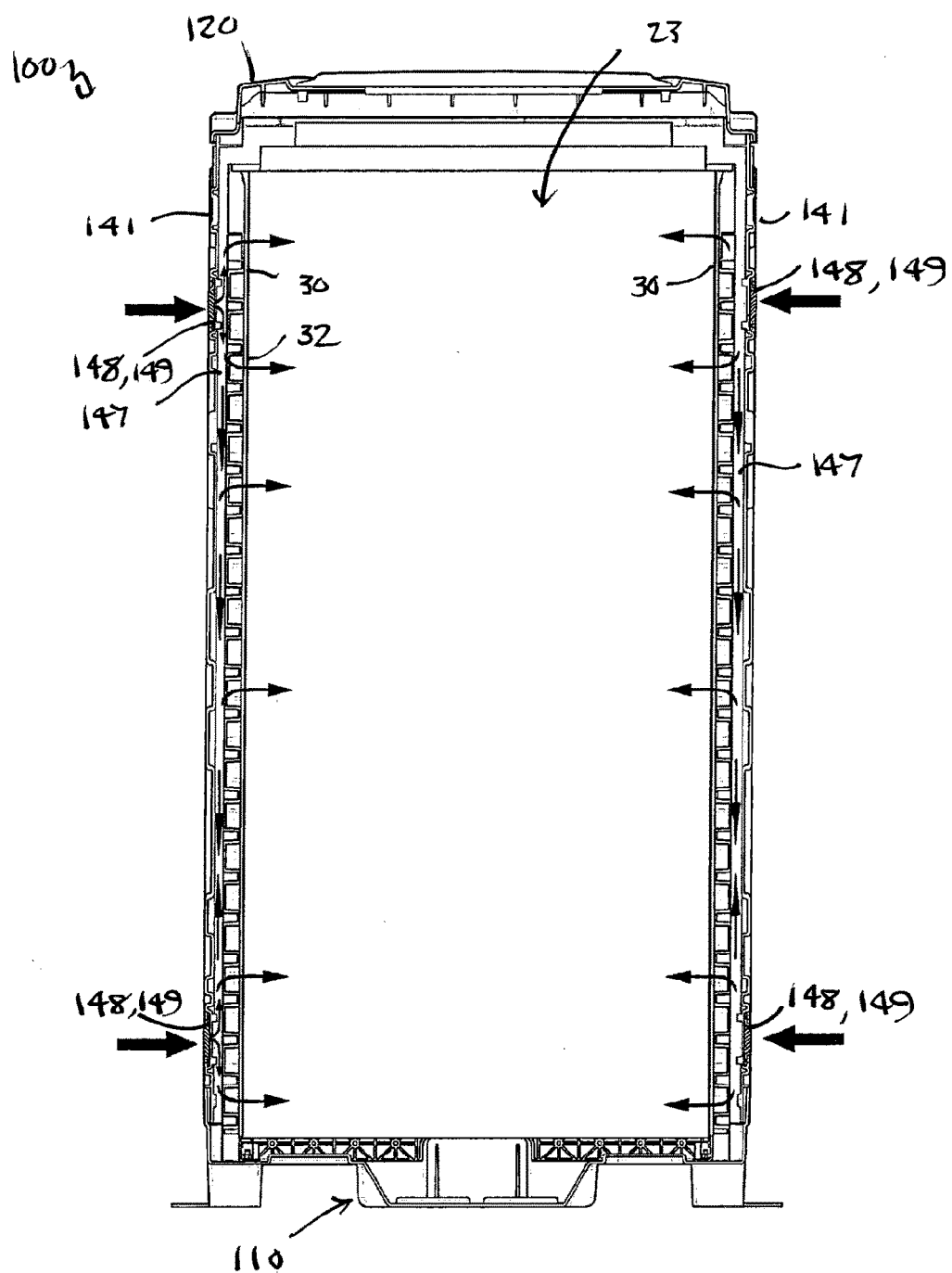
FIG. 13 is a cross-sectional view of the water biotreatment unit of FIG. 8 depicting airflow.
Figure 14:
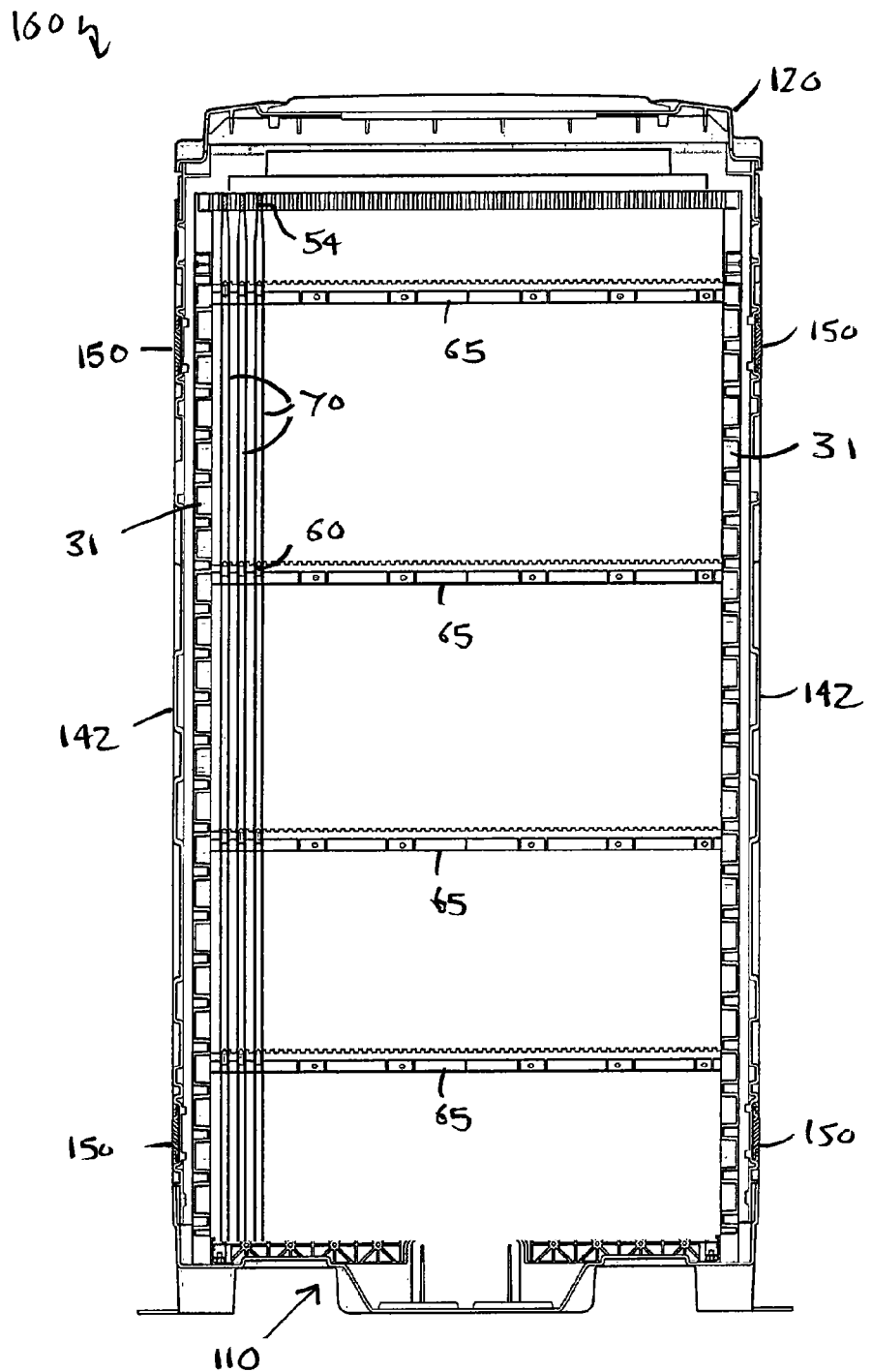
FIG. 14 is a further cross-sectional view of the water biotreatment unit of FIG. 8 depicting the arrangement of biotreatment membranes.

As best shown in FIG. 13, each of the primary outer walls 141 is located adjacent to, and spaced from, one of the primary housing walls 30, leaving a gap 147 therebetween for airflow. In this regard, each of the primary outer walls 141 (and, in the configuration depicted, each of the secondary outer walls 142) is perforated to allow airflow through the primary outer wall 141, through the gap 147 and through the airflow apertures 32 formed in each of the primary housing walls 30. Air is thus able to flow in the first direction A through the treatment cavity 23 through the air gap 72 between each of the membrane walls 71 of each biotreatment membrane 70. In the configuration depicted, each of the outer walls 141, 142 is perforated by way of two series of four airflow apertures 148 located toward the top and bottom of each outer wall 141, 142. Each series of airflow apertures 148 of each primary outer wall 141 is covered by a grill 149 to restrict particulate matter from flowing into the wastewater treatment unit 100.

Each of the secondary outer walls 142 is located adjacent to, and spaced from, one of the secondary housing walls 31.

Given there is no need for airflow in a direction perpendicular to the first direction A, however, it is envisaged that the secondary outer walls 142 may abut the secondary housing walls 31. Again given that there is no requirement for airflow in a direction perpendicular to the first direction A, covers 150 are mounted on each of the secondary outer walls 142 covering the airflow apertures 148. Alternatively, the secondary outer walls 142 could be formed without the airflow apertures 148. However as noted above, for ease of manufacture and assembly, it is preferred that the secondary outer walls 142 are identical to the primary outer walls 141.

Rather than needing to construct the water biotreatment unit in a specialised facility and transport the completed water biotreatment unit to its operating site, as is presently typically the case, the water biotreatment unit 100 may be readily provided in a "flat-pack" kit form of individual components which may be readily assembled on site without any tools, perhaps apart from a simple screw driver. Utilising the primary housing walls 30 to support the hangers, and spacers also reduces the total mass of the unit. Assembly and shipping costs may thus be greatly reduced, enabling economic supply of the water biotreatment unit 100 to distant and remote locations from a central manufacturing facility.

The water biotreatment unit 100 may be assembled by first securing the brackets 113 to an underlying support surface, such as a concrete slab, and then arranging the base 110 on the brackets 113 and securing the base 110 to the brackets 113. One of the secondary housing walls 31 is then arranged on the base 110 and the two primary housing walls 30 are also located on the base 110 and mechanically joined to the secondary housing wall 31 by way of the pins 36. The primary housing walls 30 are secured to the base 110 by way of the brackets 116.

The spacer support rails 65 are fastened to each of the primary housing walls 30 by way of fasteners 66. The spacer support rails 65 may be secured to the primary housing walls 30 either prior to, or after, joining of the primary housing walls 30 to the secondary housing wall 31. The hanger frame 50 is then mounted on top of the primary housing walls 30 and secondary housing wall 31. At this stage, the second secondary housing wall 31 is typically left out, providing access to the treatment cavity 23 along its height for ease in installation of the biotreatment membranes 70. The second secondary housing wall 31 could, however, be installed prior to the hanger frame 50 if desired.

To install each biotreatment membrane 70, one of the hangers 54 is mounted on the support frame 50, with each end of the hanger 54 being received in the recesses 53 adjacent the installed secondary housing wall 31. A spacer 60 is also mounted on each opposing pair of spacer support rails 65, again adjacent the installed secondary housing wall 31. The first biotreatment membrane 70 is then draped over the installed hanger 54 and lowered past each of the spacers 60, so that the membrane walls 71 are separated by each of the spacers 60. It is also envisaged that the biotreatment membrane 70 might be draped over the hanger 54 prior to mounting of the hanger 54 on to the hanger frame 50 and that the spacers 60 might be installed after initial installation of each biotreatment membrane 70, by lifting one of the membrane walls 71, installing the spacers 60 adjacent the remaining membrane wall 71 and then relowering the lifted membrane wall 71 back into position. This process is repeated for each biotreatment membrane 70 until all fifty eight biotreatment membranes have been installed in the treatment cavity 23. The second secondary housing wall 31 is then located in position and mechanically joined with each of the primary housing walls 30 by way of the pins 36, thereby completing assembly of the water biotreatment unit core 10.

Figure 12:
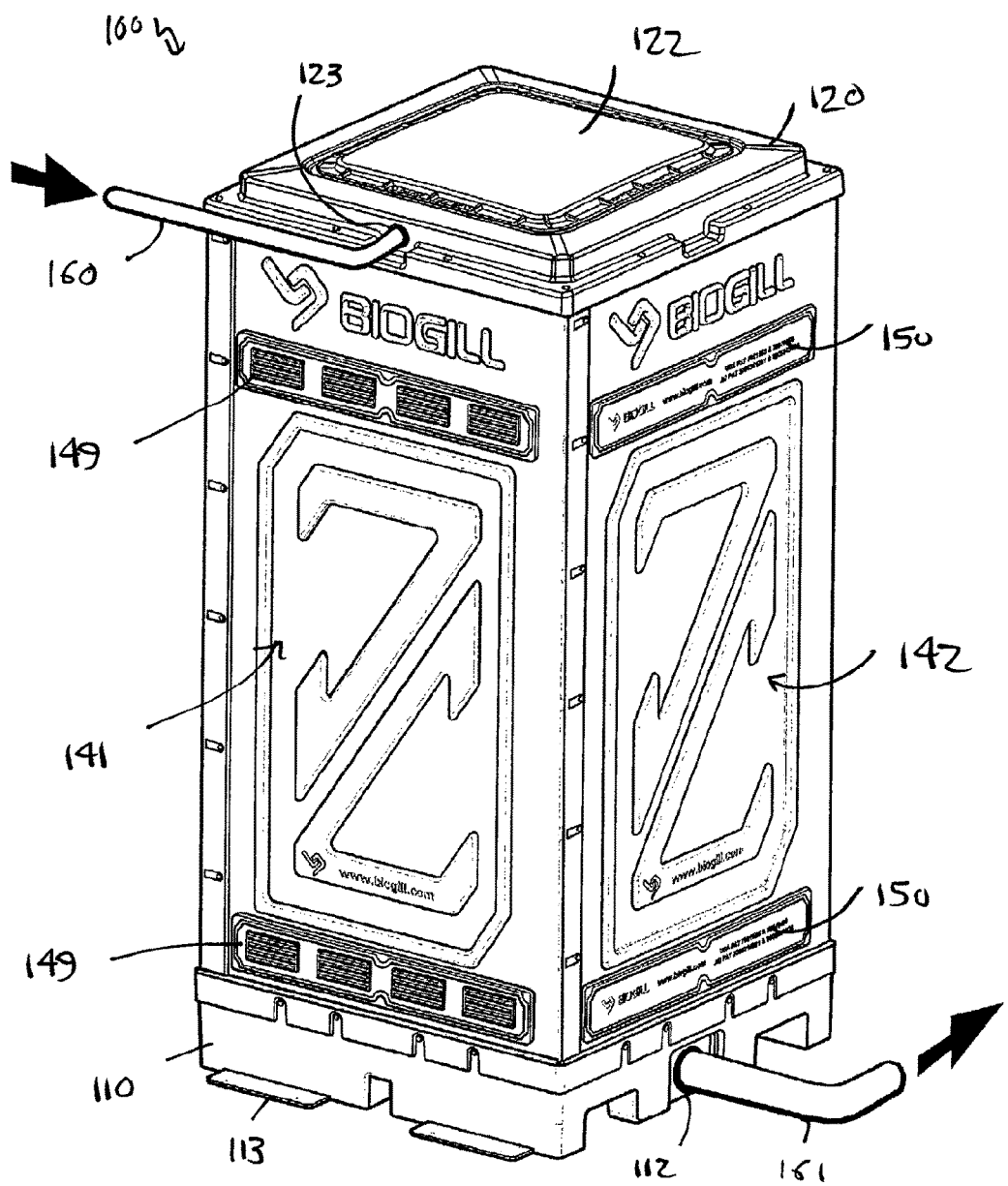
FIG. 12 is an isometric view of the water biotreatment unit of FIG. 8.

The drip trays 131 and distribution trays 133 forming the water distribution system 130 are then mounted on the hanger support frame 50. The primary and secondary outer walls 141, 142 are also assembled about the support housing 20. The lid 121 and access cover 122 are then mounted on top of the support housing 20 and upper flanges 146 of the outer walls 141, 142. Referring to FIG. 12, the inlet 123 is then connected to a source of water to be treated, such as wastewater or water from an aquaculture reservoir, by way of an inlet pipe 160 and the outlet 112 connected downstream via an outlet pipe 161, carrying water that has been treated by the water biotreatment unit 100 for further use or processing as required. In particular, the outlet 112 may be connected to a downstream settling tank or pond where solids passing out of the outlet 112 may be allowed to settle and be removed by pump.

In use, water to be treated, which may include wastewater such as sewage, or industrial wastewater, or water from an aquaculture reservoir (e.g. tank or pond) flows through the inlet pipe 160 and through the inlet 123, typically under the action of a pump, onto the water distribution system 130, where it is distributed across the top of the series of fifty eight biotreatment membranes 70. The waste laden water passes down between adjacent biotreatment membrane 70 under gravity, where it engages the biomass culture carried by the biotreatment membranes 70. Air flowing through the treatment chamber 23, specifically through the air gaps 72 between the opposing membrane walls 71 of each biotreatment membrane 70, diffuses through the membrane walls 71 to feed the required oxygen to the biomass culture, whilst nutrients from the water migrate in the opposing direction to feed growth of the biomass culture. Suspended solids in the water being treated flocculate and sheets of the biofilm slough off the membrane wall 71, pass into the sump 111 and, under action of a high water flow rate out of the outlet 112.

Old biomass culture that sloughs off the membrane walls 71 is replaced with new biomass culture cell growth, so the system constantly refreshes itself with fresh metabolically active biomass culture. This bioactivity generates heat, which provides a convective current in the airflow through the air gaps 72 between the membrane walls 71, ensuring a self-generating airflow, typically through the lower most series of apertures 148 in the primary outer walls 141 and out the upper series of apertures 148 in the primary outer walls 141. Treated water, with at least a substantial portion of waste nutrients separated, continues to fall under gravity into the base 110, where it flows through the outlet 112 and into the outlet pipe 161 for further downstream processing to settle and remove the separated solids from the treated water. Whilst the system is generally self-refreshing and will generally not result in build-up of excess biomass culture or other solids within the treatment cavity 23, if flushing of the water treatment unit 100 is desired or required, access to the treatment cavity 23 may be provided by removing the access port 122, allowing flushing of the treatment cavity 23 as required.

Figure 15:
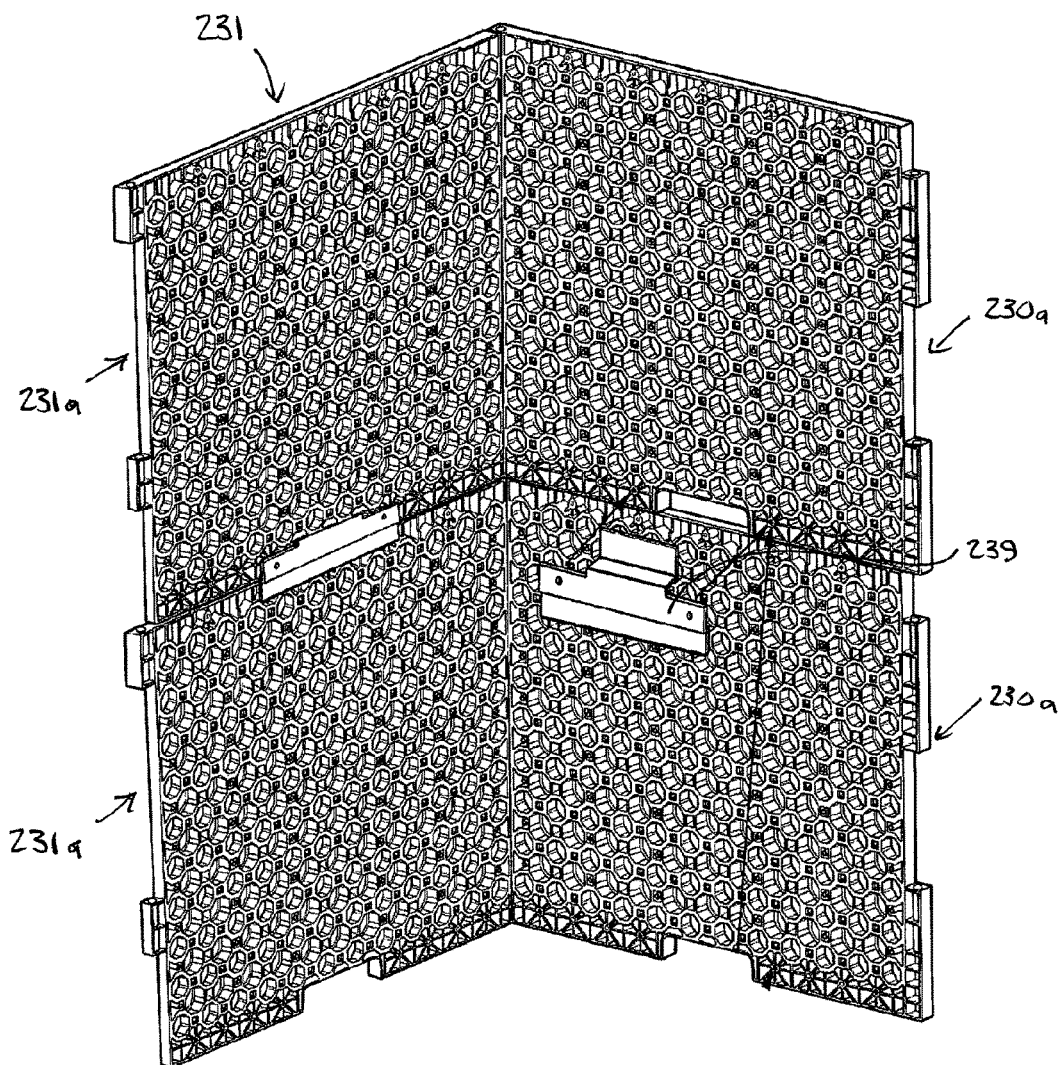
FIG. 15 is an isometric view of a pair of water biotreatment unit housing walls according to a second embodiment.
Figure 16:
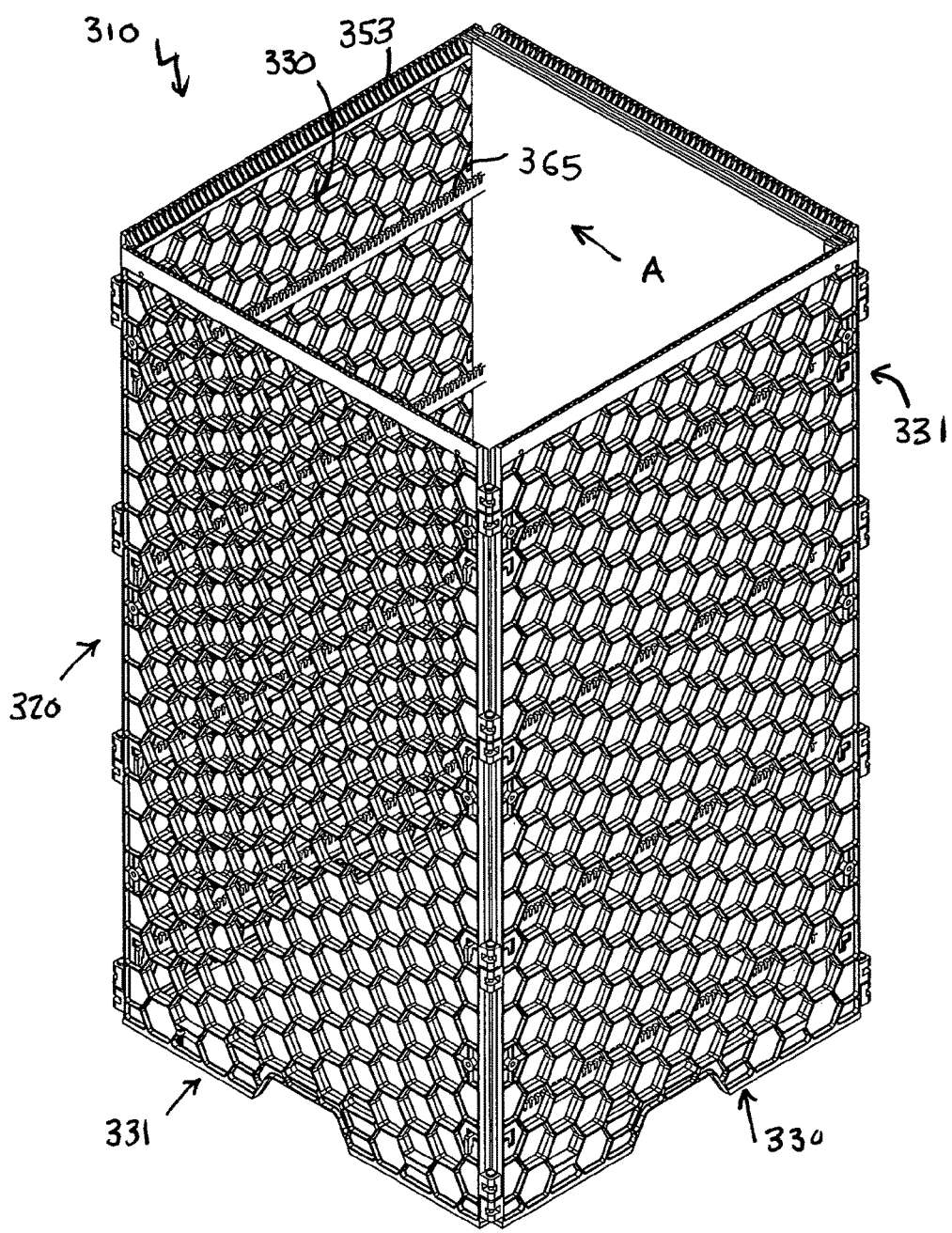
FIG. 16 is an isometric view of the core of a water biotreatment unit according to a third embodiment.
Figure 17:
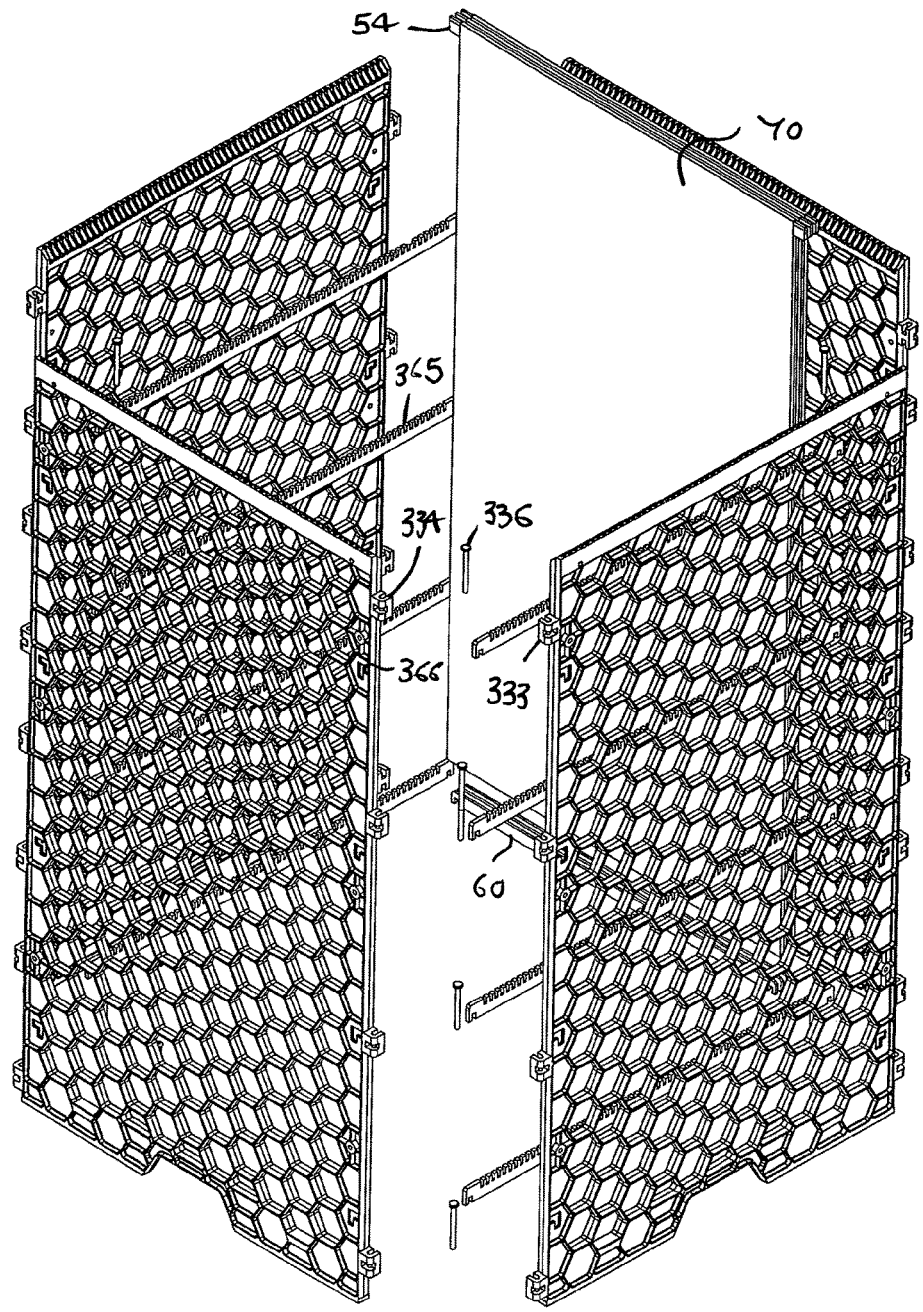
FIG. 17 is an exploded view of the water biotreatment unit core of FIG. 16.
Figures 18, 19:
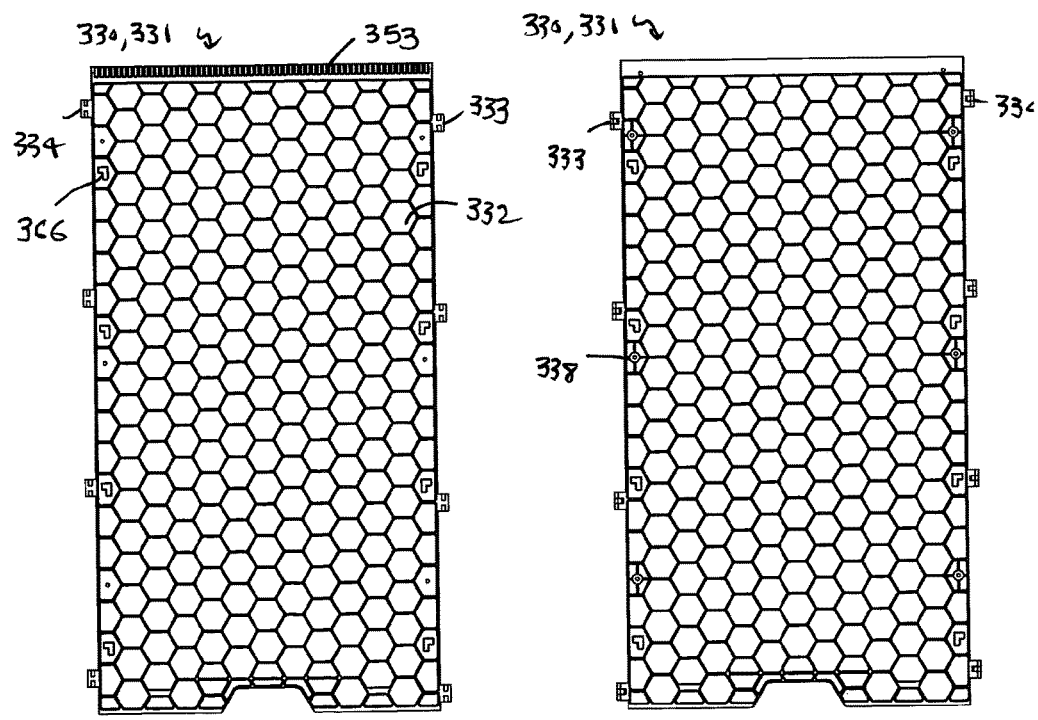
FIG. 18 is a front elevation view of a housing wall of the water biotreatment unit core of FIG. 16.
FIG. 19 is a rear elevation view of the housing wall of FIG. 18.

FIG. 15 depicts part of a water biotreatment unit core according to a second embodiment, with an alternate form of primary and secondary housing wall 230, 231 in which each housing wall is divided into two separate housing wall elements 230a, 231a. Each housing wall 230a, 231a is formed by mechanically joining two housing wall elements 230a, 231a on top of each other. A clip 239 secures the two housing wall elements 230a, 231a, with the clip 239 being fastened to either one or both of the housing wall elements 230a, 231a, via fasteners extending through apertures provided in the housing wall elements 230a, 231a. In the arrangement depicted, each of the housing wall elements 230a, 231a is identical, however it is envisaged that the housing wall elements 230a, 231a may be of differing size or configuration. Providing each housing wall 230, 231 as two separate housing wall elements 230a, 231a provides for more compact packing of a kit for forming the water biotreatment unit. The water biotreatment unit core 210 is otherwise substantially identical to the water biotreatment unit core 10 of the first embodiment.

A water biotreatment unit core 310 according to a third embodiment is depicted in FIGS. 16 to 19. The water biotreatment unit core 310 of the third embodiment is of the same general configuration as the water biotreatment unit core 10 of the first embodiment. Identical or substantially identical features are provided with like reference numerals, whereas equivalent features of the water biotreatment unit core 310 of the third embodiment are provide with reference numerals based on those of the water biotreatment unit core 10, incremented by 200.

As with the primary and secondary housing walls 30, 31 of the support housing 20 of the water biotreatment unit core 10 of the first embodiment, the primary and secondary housing walls 330, 331 of the support housing 320 of the water biotreatment unit core 10 are formed separately, mechanically joined and are each of an identical configuration. The primary and secondary housing walls 330, 331 are perforated by way of a honeycomb-type array of apertures 332, which are larger than the equivalent apertures 32 in the first embodiment, reducing the amount of plastic material to provide for more cost effective injection moulding. The housing walls 330, 331 are also thinner than those of the first embodiment, each having a thickness of 30 mm rather than 38 mm. As with the housing walls 30, 31 of the first embodiment, the housing walls 330, 331 of the third embodiment are mechanically connected by way of first and second series of apertured flanges 333, 334 which receive pins 336.

Rather than having a separately formed hanger support frame 50 mounted on the support housing upper end 21, as with the first embodiment, a series of hanger recesses 353 is integrally moulded along the length of the internal face of each of the housing walls 330, 331 adjacent the upper end thereof. As with the first embodiment, each of the hanger recesses, 353 receives the end of a hanger 54 that extends in the first direction A between the opposing primary housing walls 330. Each of the hangers 54 is thus supported directly by the primary housing walls 330 of the support housing 320.

In the water biotreatment unit core 310 of the third embodiment, the spacer support rails 365, rather than being fastened directly to one of the primary housing walls, as with the first embodiment, extend between, and are supported by, the opposing secondary housing walls 331 so as to be mounted adjacent the primary housing walls 330. Specifically, opposing ends of each spacer support rail 365 extend through, and are supported by, slots 366 formed toward each lateral edge of each secondary housing wall 331. The ends of each of the spacer support rails 365, and slots 366, are configured such that the spacer support rails 365 clip into place, without the use of any tools. Each spacer support rail 365 supports a plurality of spacers 60 in the same manner as in the first embodiment. As also in the first embodiment, the biotreatment unit core 310 further comprises a plurality of biotreatment membranes 70 that are each draped over and supported by one of the hangers 54 and spaced by the spacers 60, in the same manner as described above in relation to the first embodiment. In the third embodiment, there are specifically 60 biotreatment membranes.

Figure 20:
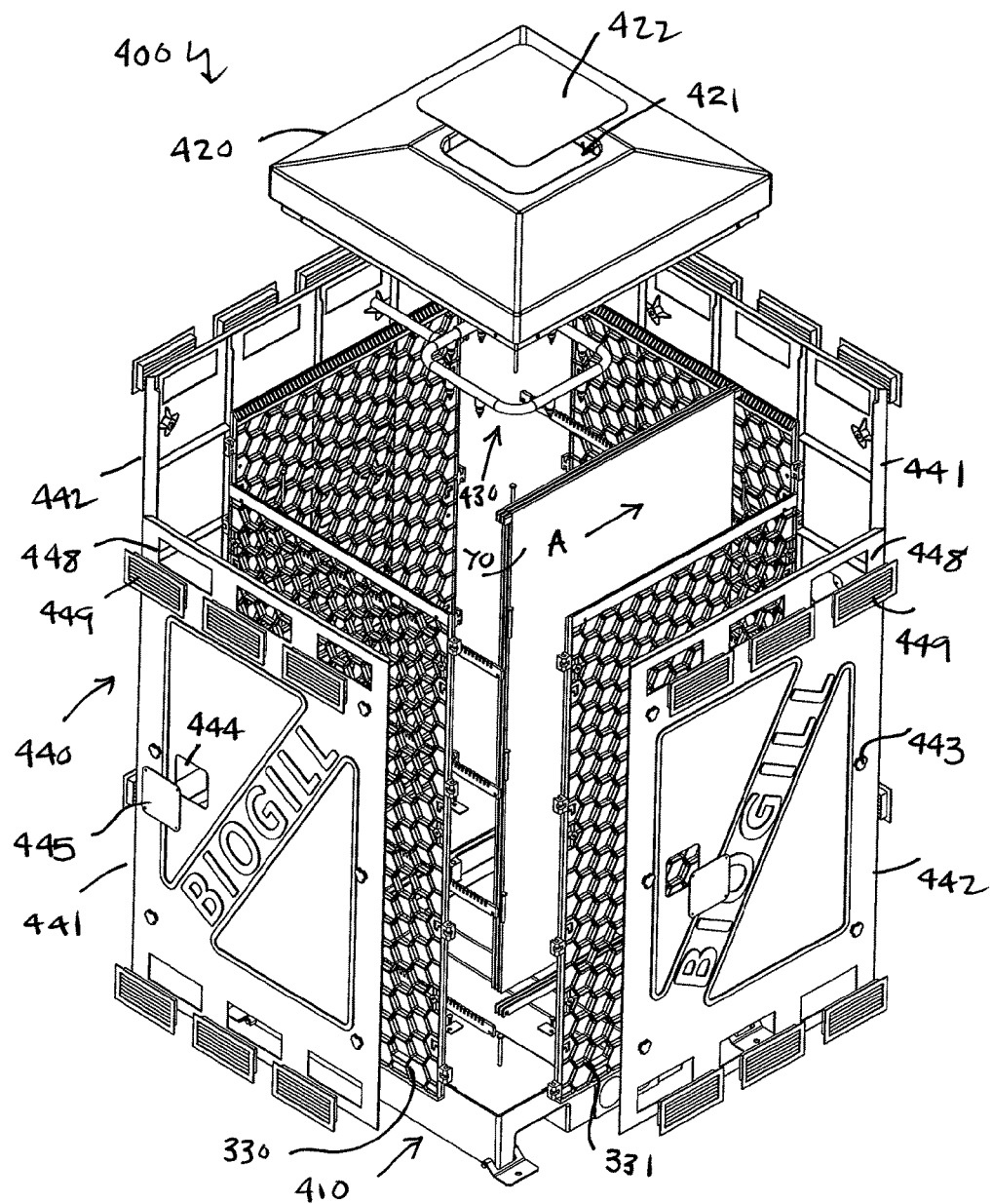
FIG. 20 is an exploded view of a water biotreatment unit according to the third embodiment incorporating the water biotreatment core of FIG. 16.
Figure 21:
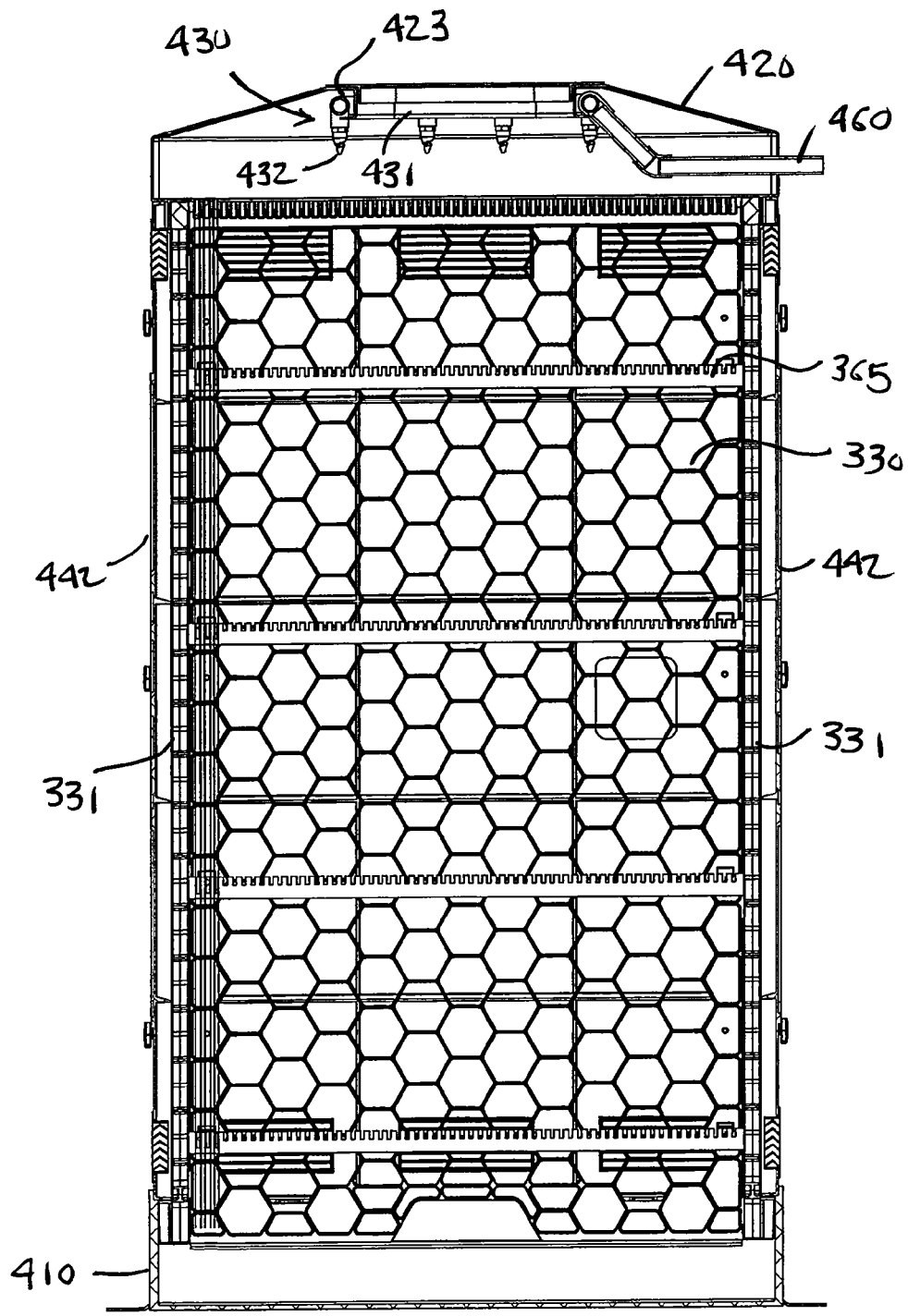
FIG. 21 is a cross-sectional view of the water biotreatment unit of FIG. 20.
Figure 22:
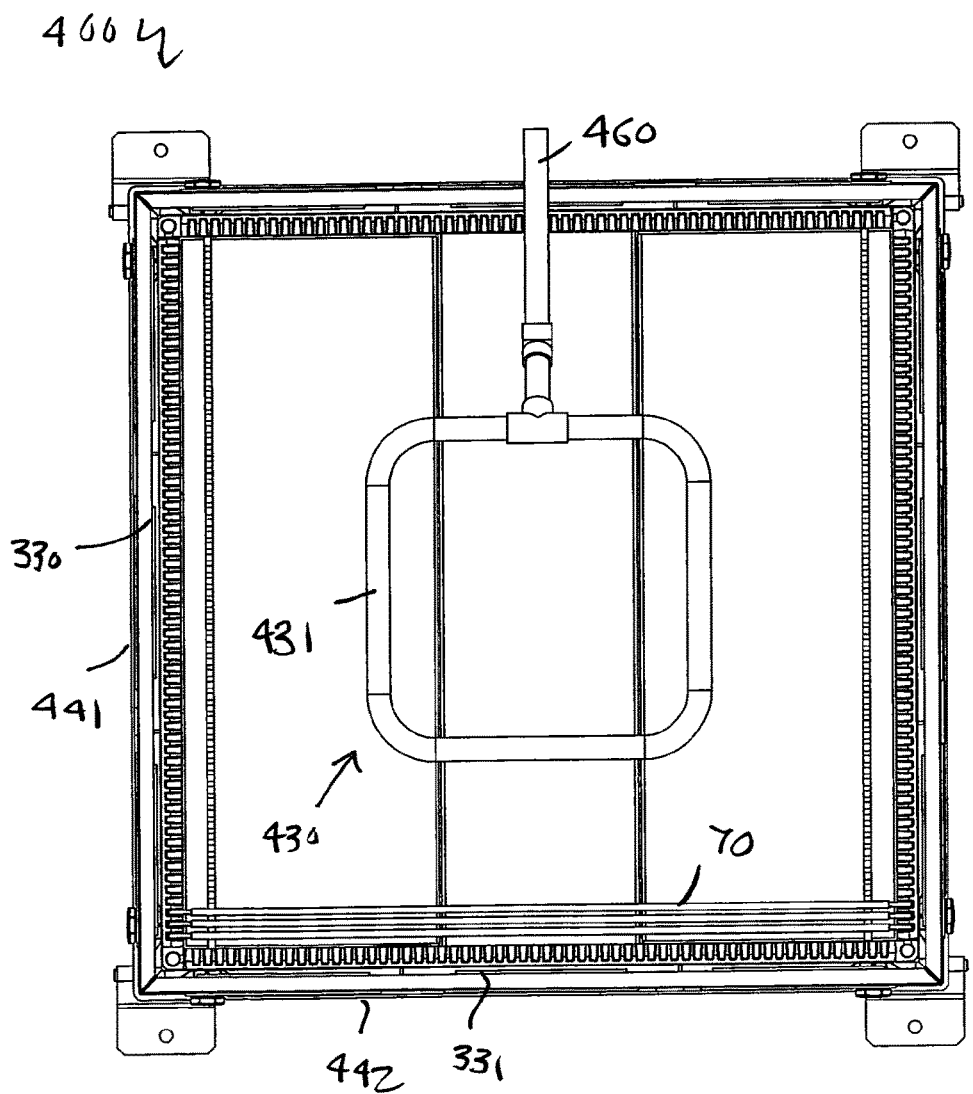
FIG. 22 is a plan view of the water biotreatment unit of FIG. 20, with the lid removed.

FIGS. 20 to 22 depict a water biotreatment unit 400 according to a third embodiment, incorporating the water biotreatment unit core 310. The water biotreatment unit 400 is again of the same general configuration as the water biotreatment unit 100 of the first embodiment, further comprising a base 410 on which the support housing 320 is mounted, primary and secondary outer walls 441, 442 forming an outer housing 440, a lid 420 and a water distribution system 430.

The water distribution system 430 differs from the water distribution system 130 of the first embodiment, comprising an inlet pipe 160 connected to a tubular distribution ring 431 with eight spray nozzles 432 spaced along the distribution ring 431. As best seen in FIG. 21, the distribution ring 431 is fitted to a channel 423 formed on the lower side of the lid 420 extending about the central access opening 421 on which is mounted a removable cap 422.

The outer housing 440 comprises a pair of opposing primary outer walls 441 and a pair of opposing secondary outer walls 442 which, in the arrangement depicted, are identical to the primary outer walls 441. Rather than forming the outer housing 440 by directly mechanically joining the primary and secondary outer walls 441, 442, as is the case in the first embodiment, the primary outer walls 441 are joined directly to the adjacent primary housing walls 430 and the secondary outer walls 442 are joined directly to the adjacent secondary housing walls 431. Each of the outer walls 441, 442 is mechanically joined to its respective housing wall 430, 431 by way of fasteners 443 passing through the respective outer wall 441, 442 into one of the apertures 338 formed in the corresponding housing wall 430, 431 adjacent the lateral sites thereof. As with the outer walls 141, 142 of the first embodiment, the outer walls 441, 442 of the third embodiment are provided with airflow apertures 448 which may each be covered with a grill 449 (or, in the case of the secondary outer walls 442, a solid cover given that there is no requirement for airflow in a direction perpendicular to the first direction A). Each of the outer walls 441, 442 is also provided with an additional inspection port 444 and associated cover 445.

Assembly and operation of the biotreatment unit 400 is generally identical to that described above in relation to the first embodiment.

A person skilled in the art will appreciate that various modifications may be made to the water biotreatment units, kits and method described as desired.

The invention claimed is:

1. A water biotreatment unit comprising:
a support housing vertically extending between a support housing upper end and a support housing lower end, said support housing comprising a pair of opposing primary housing walls and a pair of opposing secondary housing walls, each of said secondary housing walls being formed separately to, and mechanically joined to, each of said primary housing walls, each of said primary housing walls being perforated to allow air flow in a first direction laterally through a treatment cavity defined by said housing walls;
a plurality of hangers each extending in said first direction between said primary housing walls and supported by said support housing, said hangers being spaced between said secondary housing walls across said treatment cavity;
a plurality of biotreatment membranes, each said biotreatment membrane carrying a biomass culture and being draped over, and support by, one of said hangers to define two opposing membrane walls each extending downwardly from said hanger; and
an outer housing extending about said support housing, said outer housing comprising a pair of opposing primary outer walls and a pair of opposing secondary outer walls, each said secondary outer wall being formed separately to each of said primary outer walls, each said primary outer wall being adjacent to, and spaced from, one of said primary housing walls and perforated to allow air flow through the primary outer wall and the adjacent said primary housing wall, each said secondary outer wall being adjacent one of said secondary housing walls.

2. The water biotreatment unit of claim 1, further comprising a plurality of spacers each extending in said first direction between said primary housing walls and supported by said support housing, each said spacer extending between said membrane walls of one of said membranes to space said membrane walls.

3. The water biotreatment unit of claim 1 wherein each said primary housing wall is perforated by way of a honeycomb-type array of apertures distributed across at least a majority of said primary housing wall.

4. The water biotreatment unit of claim 1 wherein each said primary and secondary housing wall is identical.

5. The water biotreatment unit of claim 1 wherein each said secondary housing wall is joined to each said primary housing wall by way of a connection along adjacent side edges of the respective said secondary housing wall and primary housing wall.

6. The water biotreatment unit of claim 5 wherein each said connection comprises a first series of apertured flanges formed along one side edge of one of said primary housing walls, a second series of apertured flanges formed along an adjacent side edge of one of said secondary housing walls and one or more pins extending through one or more of said flanges of said secondary housing wall and one or more of said flanges of said primary housing wall.

7. The water biotreatment unit of claim 1 wherein said biotreatment unit further comprises a series of opposing hanger recesses arranged adjacent an upper end of each of said primary housing walls, each said hanger recess receiving an end of one of said hangers.

8. The water biotreatment unit of claim 1, further comprising a pair of opposing spacer support rails, each said spacer support rail being mounted adjacent one of said primary housing walls, each said spacer support rail being adapted to support an end of each of said spacers.

9. The water biotreatment unit of claim 8 wherein each of said spacer support rails is provided with a series of spacer recesses, each said spacer recess receiving an end of one of said spacers.

10. The water biotreatment unit of claim 1, further comprising a lid mounted on said outer housing, said lid being provided with a removable cap mounted over an access port formed in said lid.

11. The water biotreatment unit of claim 1, further comprising a base on which said support housing is mounted, said base defining a sump beneath said plurality of biotreatment members and an outlet for passage of treated water.

12. A kit for forming a water biotreatment unit, said kit comprising:
a pair of primary housing walls, each being perforated to allow airflow therethrough;
a pair of secondary housing walls each formed separately to each of said primary housing walls, said primary and secondary housing walls being configured to mechanically join each of said secondary housing walls to each of said primary housing walls to define a support housing defining a treatment cavity;
a plurality of hangers adapted to extend in a first direction between said primary housing walls and supported by said support housing with said hanging rails spaced between said secondary housing walls across said treatment cavity;
a plurality of biotreatment membranes, each said biotreatment membrane carrying a biomass culture and adapted to be draped over, and supported by, one of said hangers to define, two opposing membrane walls each extending downwardly from said hanger; and
a pair of primary outer walls and a pair of secondary outer walls, said primary and secondary outer walls being adapted to form an outer housing extending about said support housing with each said primary outer wall located adjacent to, and spaced from, one of said primary housing walls when assembled and perforated to allow airflow through the primary outer wall and the adjacent said primary housing wall.

13. The kit of claim 12, further comprising a plurality of spacers adapted to be supported by said support housing and extending between said primary housing walls in said first direction with each said spacer extending between said membrane walls of one of said biotreatment membranes to space said membrane walls, when assembled.

14. The kit of claim 12, further comprising a pair of opposing spacer support rails, each said spacer support rail being adapted to be mounted adjacent one of said primary housing walls, each said spacer support rail being adapted to support an end of each of said spacers.

15. The kit of claim 12, further comprising a lid adapted to be mounted on said outer housing and a removable cap adapted to be mounted over an access port formed in said lid.

16. The kit of claim 12, further comprising a base defining a sump and an outlet for passage of treated water, said base being configured to receive said support housing.

17. A method of assembling the kit of claim 12, said method comprising:
a) mechanically joining one of said secondary housing walls to each of said primary housing walls so as to partly form said support housing;
b) mounting each of said plurality of hangers so as to extend in said first direction between said primary housing walls and supported by said support housing, with said hangers being mutually spaced;
c) draping each of said plurality of biotreatment membranes over one of said hangers such that said biotreatment membrane is supported by said hanger and defines said two opposing membrane walls each extending downwardly from said hanger; and
d) mechanically joining the other of said secondary housing walls to each of said primary housing walls to complete said support housing.

18. The method of claim 17, further comprising the step of mounting each of a plurality of spacers to extend in said first direction between said primary housing walls and be supported by said support housing with each said spacer extending between said membrane walls of one of said membrane walls.

* * * * *